Patented Nov. 4, 1941

2,261,926

UNITED STATES PATENT OFFICE 2,261,926

PROCESS FOR PRODUCING LACTIC ACID

Arthur J. Nolte and Harry W. von Loesecke, Winter Haven, Fla.; dedicated to the free use of the People of the United States No Drawing. Application March 15, 1940, Serial No. 324,107

2 Claims. (Cl. 195—48)

(Granted under the act of March 3, 1883, as amended April 30, 1928; 370 O. G. 757)

This application is made under the act of March 3, 1883, as amended by the act of April 30, 1928, and the invention herein described and claimed may be used by or for the Government for governmental purposes without payment to us of any royalty thereon.

We hereby dedicate the invention herein described to the free use of the people of the United States to take effect on the granting of the patent to us.

In present commercial practice, lactic acid and calcium lactate may be produced from starch, molasses, and dextrose by fermenting with lactic acid bacterial of the Lactobacillus delbruckii type. Or these chemicals may be obtained from whey.

Our invention differs from these well-known methods, and relates to the production of lactic acid and calcium lactate from sacchariferous fruit juices, and particularly grapefruit juice, by means of micro-organisms naturally found present in such juices, the control of said organisms being accomplished by maintaining the pH and temperature of the fermenting liquor most suitable for their growth, while unsuitable for the growth and maintenance of all other organisms not conducive to the production of lactic acid.

In our process sacchariferous fruit juices, and particularly grapefruit juice, are screened by any well-known method, and to the screened juice is added sufficient calcium carbonate (free from iron and low in magnesium) to completely neutralize the acid present. We have found that by neutralizing the acid present more optimum conditions for the growth of these lactic acid bacteria are obtained. In the case of grapefruit juice this neutralization will give a precipitate of calcium citrate, which it is not necessary to remove at this stage of our process.

The neutralized liquid is rapidly warmed to at least 52° C. and maintained substantially at this temperature during fermentation. During this period of fermentation, periodic neutralization with calcium carbonate is necessary in order to maintain the pH between 4.0 and 6.5.

It is advantageous to prepare starters, where large volumes of juice are to be fermented. This saves time and aids in acclimating the organisms to the medium. The starter is prepared by maintaining the juice (previously neutralized with calcium carbonate) at 50° C. for two or three days. We may add the proportion of about five percent by volume of such a starter to the main batch of juice.

After fermentation has been completed, judged by the fact reducing sugars are less than one percent, calcium oxide or calcium hydroxide may be added until the liquor is alkaline to phenolphthalein. The precipitate of calcium citrate, hereinabove mentioned, in the case of orange or grapefruit juice, is now removed by any suitable means, and about 93 percent of the calculated amount of citric acid present in the juice may be recovered as calcium citrate.

The filtrate and washings from the calcium citrate should be treated while hot preferably with activated charcoal (2 percent based on the weight of the liquor) and filtered, preferably by means of any type of plate and frame press, using a filter aid.

This filtered liquor is light amber in color, and from which calcium lactate may be obtained in any manner now already known to the art, such as by concentration and crystallization. Lactic acid may be obtained from this calcium lactate by methods already known, such as by acidification with $H_2SO_4$ and concentration.

Having thus described our invention, what we claim for Letters Patent is:

1. The method for producing lactic acid from sacchariferous fruit juices by fermentation, which comprises neutralizing the natural fruit acid present in the juices and permitting the insoluble calcium salts to settle, thence adding to the juices a starter containing lactic acid forming bacteria normally present in such juices, maintaining the said juices at a temperature of at least 52° C. throughout fermentation, the while maintaining the pH of the juices between 4.0 and 6.5 by periodically neutralizing the lactic acid thus formed, thence recovering the insoluble calcium salts, and thence recovering the lactic acid.

2. The method of producing lactic acid from grapefruit juices, which comprises subjecting screened grapefruit juice to the action of calcium carbonate that is free from iron and low in magnesium, thereby neutralizing the grapefruit juice and giving a precipitate of calcium citrate; thence rapidly heating the neutralized liquid to a temperature of at least 52° C., maintained during fermentation, the while adding calcium carbonate in amounts sufficient to maintain a pH between 4.0 and 6.5; thence adding calcium hydroxide until the liquor is alkaline; thence removing the precipitated calcium citrate, and the while recovering substantially 93% of the calculated amount of citric acid present in the juice as calcium citrate; thence washing and filtering the calcium citrate; thence subjecting the filtered liquor to concentration and crystallization, thereby obtaining calcium lactate; and, thence acidifying the lactate and obtaining lactic acid.

ARTHUR J. NOLTE.
HARRY W. VON LOESECKE.